Patented June 20, 1939

2,163,100

UNITED STATES PATENT OFFICE 2,163,100

PRODUCTION OF FINELY DIVIDED SODAMIDE

Clemmy O. Miller and Richard G. Roberts, Chicago, Ill., assignors to E. I. du Pont de Nemours and Company, Wilmington, Del., a corporation of Delaware No Drawing. Application September 13, 1934, Serial No. 743,841

13 Claims. (Cl. 23—190)

Our invention relates to improvements in the manufacture of sodamide, and more specifically to the production of finely divided sodamide.

The purpose of our invention is to obtain sodamide in a physical form which can be used in chemical reactions without grinding or further pulverizing as is now necessary when sodamide made by the present processes is used.

These are essentially two important methods now being used for the production of sodamide. In one case, metallic sodium is fused, and brought to a temperature in the range of 200–350° C. Dry ammonia gas is passed into the fused mass, whereupon a chemical reaction takes place, and sodamide and hydrogen are formed. When the fused mass solidifies, hard lumps are formed. In many cases, these hard lumps must be pulverized before use, since substances in their powdered form react faster than when in lump form due to the increased surface. The process of pulverizing is not satisfactory in that sometimes sodamide explodes during pulverizing and it is always hygroscopic. Therefore, it must be pulverized in a moisture-free atmosphere. The second essential method for the production of sodamide is to dissolve sodium in anhydrous liquid ammonia, add either iron rust or a rusty piece of iron, and allow the materials to warm up, under pressure. This process is inconvenient in that the catalytic reaction proceeds slowly at the temperature of anhydrous ammonia at atmospheric pressure. Although the reaction proceeds faster at temperatures of 15 to 100° C., the vapor pressure of the anhydrous ammonia and the pressure of hydrogen which is formed in the chemical reaction is very great, and requires the use of equipment built to withstand very high pressures.

Our invention consists essentially in transforming metallic sodium dissolved in anhydrous liquid ammonia into powdered sodamide by using a catalyst comprising a selected iron compound or mixture of selected iron compounds. Two outstanding advantages gained by the practice of our invention are that sodamide is produced in pulverized form, thus avoiding the dangers and inconvenience of pulverizing and the possibilities of deterioration of the product from hydrolysis. The second advantage is that the reaction is rapidly carried out at atmospheric pressure, which avoids equipment required for heating and withstanding great pressures.

We will now describe in detail how we carry out our invention. In one case, we proceed as follows: Two hundred parts of anhydrous liquid ammonia are drawn from a commercial container into a suitable well-insulated container. Five parts of sodium are added to the anhydrous liquid ammonia. It is allowed to dissolve either with or without stirring. The solution turns to a deep blue color. Five hundredths of a part of ferric sulphate is added to the ammonia solution of sodium. The chemical reaction in which sodium is transformed to sodamide proceeds immediately and rapidly with the simultaneous production of hydrogen. The reaction is complete in less than ten minutes. The blue color is discharged when the reaction is complete. The ferric sulphate dissolves in the anhydrous liquid ammonia and the sodamide precipitates out. We can, if we desire, add five more parts of sodium to the anhydrous liquid ammonia and, if we like, more ferric sulphate. A chemical reaction proceeds as before. The precipitated sodamide can be separated from the supernatant anhydrous liquid ammonia by any convenient process, such as filtration, decantation, evaporation, et cetera.

Or again, we may proceed as follows: Two hundred parts of anhydrous liquid ammonia are drawn into a suitable well-insulated container. Five parts of metallic sodium are added and dissolved in it. One-tenth of a gram of dried hemoglobin is added, whereupon a chemical reaction takes place and the sodium is converted into sodamide with simultaneous liberation of hydrogen gas. The reaction is complete in about an hour. The sodamide precipitates. We can add, if we like, more sodium and more hemoglobin to the anhydrous liquid ammonia. The chemical reaction proceeds as before. The sodamide can be separated from the anhydrous liquid ammonia by any convenient process, such as filtration, decantation, evaporation, etc.

Other substances may be used instead of ferric sulphate and hemoglobin as indicated in Table 2. Since the substances act catalytically, changing the proportions of catalyst and sodium from those given in Table 2 does not alter the character of the reaction. It alters essentially only the rate of the reaction. Our invention also includes the use of mixtures of two or more of these substances. Table 2 includes representative compounds from the specified class but not all of them. Our invention is not to be construed to be limited to these only.

By anhydrous liquid ammonia we mean ammonia gas condensed to a liquid under pressure and commercially referred to as "anhydrous ammonia". Commercial anhydrous ammonia contains a slight amount of water as an impurity. We prefer to remove this water by any convenient process before adding sodium, since sodium will react with it first to form sodium hydroxide. This decreases the yield of sodamide and introduces sodium hydroxide as an impurity.

Some of the catalyst is precipitated with the sodamide. The proportions of sodium and anhydrous liquid ammonia may be changed without altering essentially the nature of the chemical reaction or the essential chemical character of the product. Too high a concentration of sodium, favors the precipitation of some sodium with the sodamide which is undesirable.

While we prefer to practice our invention because of convenience at the boiling point of ammonia at atmospheric pressure, which is approximately —33° C., it is not limited to that temperature. At higher temperatures and pressure the reaction is essentially the same.

We have found it convenient to add a small amount of benzene, paraffin oil, or some inert organic liquid to the sodamide and anhydrous liquid ammonia previous to the complete removal of ammonia. This prevents air from coming in contact with the finely divided sodamide.

We claim as our invention:

1. A process for producing sodamide which comprises reacting metallic sodium with anhydrous liquid ammonia in the presence of ferric sulphate and recovering the product.

2. A process for producing sodamide which comprises reacting metallic sodium with anhydrous liquid ammonia in the presence of ferric chloride and recovering the product.

3. A process for producing sodamide by treating a solution of metallic sodium in anhydrous liquid ammonia with a catalyst selected from the group consisting of ferric sulphate, ferric chloride, ferric nitrate, ferrous sulphate, iron acetate, ferric oxalate, ferric persulphate, ferric subsulphate, ferric citrate, ferric tannate, iron glycerine phosphate, iron carbonate and iron sulphocarbolate, and recovering the product.

4. A process for producing sodamide which comprises reacting metallic sodium with anhydrous liquid ammonia in the presence of a catalyst selected from the group consisting of iron salts and organic iron compounds, and recovering the product.

*Catalytic effect of iron substances on transformation of sodium in anhydrous ammonia to sodamide*

TABLE 1

Table 1 lists the compounds of iron and compounds of iron associated with metallic iron that are well known to the art to catalyze the reaction of sodium with anhydrous liquid ammonia. The table gives data which indicates the speed of reactivity.

| Substance | Amt. of sodium, gm. | Amount of catalyst | | Time | Remarks |
|---|---|---|---|---|---|
| | | Molecular equiv. | Metal, gm. | | |
| Rusty iron nail | 0.1 | 10 | Approx. 10 | 5 hrs. | Slow catalytic action. |
| Rusty iron wire 2.8 g., oxidized copper wire 0.5 g | 0.1 | 3.3 | Approx. 3.3 | 7 hrs. | Do. |
| Iron oxide (red) Fe$_2$O$_3$ | 0.1 | 0.1 | 0.07 | 40 min. | Good catalytic action. |
| Iron oxide (black) magnetic Fe$_3$O$_4$ | 0.1 | 0.1 | 0.072 | 20 min. | Fair catalytic action. |
| Ferric and ferrous oxide | 0.1 | 0.1 | 0.071 | 1.25 hr. | Do. |

TABLE 2

Table 2 lists the compounds of iron which we have found to catalyze the reaction between sodium and anhydrous liquid ammonia. They show their catalytic effect without the presence of metallic iron. The table gives data which indicates the speed of reactivity. Some compounds show marked catalytic action; others show only slight action. Our invention includes all of the compounds in this table that are essentially as disclosed previously.

| Substance | Amount of sodium, gm. | Amount of catalyst | | Time | Remarks |
|---|---|---|---|---|---|
| | | Molecular equiv. | Metal, gm. | | |
| Ferric ammonium sulphate | 0.1 | 0.1 | 0.015 | | Very slow catalytic action. |
| Potassium ferrocyanide and potassium ferricyanide (eq. mixt.) | 0.1 | 0.1 (0.05 of each) | 0.015 | | Do. |
| Ferrous sulfate FeSO$_4$ | 0.1 | 0.1 | 0.037 | 12 min. | Good catalytic action. |
| Ferric citrate | 0.1 | 0.1 | 0.009 | 1 hr. | Slow catalytic action. |
| Ferric nitrate Fe(NO$_3$)$_3$ | 0.1 | 0.1 | 0.023 | 2.4 min. | Very good catalytic action. |
| Ferric sulfate Fe(SO$_4$)$_3$ | 0.1 | 0.1 | 0.028 | 30 sec. | Excellent catalytic action (best catalyzer).* |
| Ferric chloride FeCl$_3$·6H$_2$O | 0.1 | 0.1 | 0.026 | 2 min. | Excellent catalytic action (2d best catalyzer).* |
| Ferric sulfate and ferric chloride FeCl$_3$·Fe$_2$(SO$_4$)$_3$ | 0.1 | 0.1 (0.05 g. each) | 0.027 | 7 min. | Very good catalytic action. Combination less efficient than each subst. sep. |
| Ferric sulfate and copper sulfate Fe$_2$(SO$_4$)$_3$·H$_2$O, CuSO$_4$·H$_2$O | 0.1 | 0.1 (0.05 g. each) | 0.026 | 6 min. | Very good catalytic action. Probably due to the iron salt alone. |
| Hematin | 0.1 | 0.1 | 0.01 | 8 min. | Very good catalytic action. |
| Hemoglobin | 0.1 | 0.5 | −0.1 | 36 min. | Fair catalytic action. |
| Ferrosoferric phosphate | 0.1 | 0.1 | 0.04 | | Slow catalytic action. |
| Ferric persulfate | 0.1 | 0.1 | 0.03 | 2.5 min. | Excellent catalytic action. |
| Ferric subsulfate | 0.1 | 0.1 | 0.31 | 4.5 min. | Do. |
| Ferric ferrocyanide Prussian Blue | 0.1 | 0.1 | 0.071 | 2 hrs. | Poor catalytic action. |
| Ferric tannate (Iron digallate) | 0.1 | 0.1 | 0.008 | 17 min. | Good catalytic action. |
| Iron sulfide FeS | 0.1 | 0.1 | 0.047 | 50 min. | Poor catalytic action. |
| Iron acetate | 0.1 | 0.1 | 0.031 | 3 min. | Excellent catalytic action. |
| Ferric oxalate | 0.1 | 0.1 | 0.023 | 2 min. | Do. |
| Sodium nitroprusside Na$_2$Fe(CN)$_5$NO·2H$_2$O | 0.1 | 0.1 | 0.019 | 1 hr. | Poor catalytic action. |
| Ferric phosphate | 0.1 | 0.1 | 0.025 | | Very slow catalytic action. |
| Ferric pyrophosphate | 0.1 | 0.1 | 0.025 | | Do. |
| Ferrous phosphate | 0.1 | 0.1 | 0.033 | | Do. |
| Ferric hypophosphite | 0.1 | 0.1 | 0.022 | | Do. |
| Iron glycerine phosphate | 0.1 | 0.1 | 0.024 | 22 min. | Fair catalytic action. |
| Iron carbonate | 0.1 | 0.1 | 0.048 | 7.5 min. | Good catalytic action. |
| Ferrous arsenate | 0.1 | 0.1 | 0.001 | | Very slow catalytic action. |
| Iron sulphocarbolate | 0.1 | 0.1 | 0.024 | 7 min. | Good catalytic action. |
| Iron strychnine citrate | 0.1 | 0.1 | 0.001 | 10 min. | Do. |

5. A process for producing sodamide which comprises reacting metallic sodium with anhydrous liquid ammonia in the presence of an iron salt and recovering the product.

6. A process for producing sodamide which comprises reacting metallic sodium with anhydrous liquid ammonia in the presence of an organic compound of iron and recovering the product.

7. A process for producing sodamide which comprises reacting metallic sodium with anhydrous liquid ammonia in the presence of a catalyst selected from the group consisting of hemoglobin and its iron-containing derivatives, and recovering the product.

8. A process for producing sodamide which comprises reacting metallic sodium with anhydrous liquid ammonia in the presence of hematin and recovering the product.

9. A process for producing sodamide which comprises reacting metallic sodium with anhydrous liquid ammonia in the presence of an iron-containing compound giving substantial quantities of iron ions and recovering the product.

10. A process for producing sodamide which comprises reacting metallic sodium with liquid ammonia in the presence of ferric sulphate and recovering the product.

11. A process for producing sodamide which comprises reacting metallic sodium with liquid ammonia in the presence of ferric chloride and recovering the product.

12. A process for producing sodamide by treating a solution of metallic sodium in liquid ammonia in the presence of ferric nitrate and recovering the product.

13. A process for producing sodamide by reacting metallic sodium with liquid ammonia in the presence of an inorganic iron salt as a catalyst.

CLEMMY O. MILLER.
RICHARD G. ROBERTS.

CERTIFICATE OF CORRECTION.

Patent No. 2,163,100. June 20, 1939.

CLEMMY O. MILLER, ET AL.

It is hereby certified that error appears in the printed specification of the above numbered patent requiring correction as follows: Page 2, first column, line 58, Table 2, for "Ferric sulfate $Fe(SO_4)_3$" read Ferric sulfate $Fe_2(SO_4)_3$; and that the said Letters Patent should be read with this correction therein that the same may conform to the record of the case in the Patent Office.

Signed and sealed this 15th day of August, A. D. 1939.

Leslie Frazer (Seal) Acting Commissioner of Patents.